United States Patent
Herslow

(10) Patent No.: US 8,672,232 B2
(45) Date of Patent: Mar. 18, 2014

(54) COMBINATION CARD OF METAL AND PLASTIC

(75) Inventor: John Herslow, Scotch Plains, NJ (US)

(73) Assignee: Composecure, LLC, Mountainside, NJ (US)

( * ) Notice: Subject to any disclaimer, the term of this patent is extended or adjusted under 35 U.S.C. 154(b) by 0 days.

(21) Appl. No.: 13/135,139

(22) Filed: Jun. 27, 2011

(65) Prior Publication Data

US 2012/0325914 A1  Dec. 27, 2012

(51) Int. Cl.
*G06K 19/06* (2006.01)
(52) U.S. Cl.
USPC .......................... 235/492; 235/487; 235/488
(58) Field of Classification Search
USPC ......... 235/487, 488, 492, 493, 494; 29/527.1, 29/558, 592.1
See application file for complete search history.

(56) References Cited

U.S. PATENT DOCUMENTS

| | | | | |
|---|---|---|---|---|
| 5,367,766 | A * | 11/1994 | Burns et al. | 29/848 |
| 2002/0130186 | A1* | 9/2002 | Lasch et al. | 235/488 |
| 2003/0116633 | A1* | 6/2003 | Clayman et al. | 235/488 |
| 2006/0071084 | A1* | 4/2006 | Detig et al. | 235/492 |
| 2009/0294543 | A1* | 12/2009 | Varga et al. | 235/492 |

\* cited by examiner

*Primary Examiner* — Michael G Lee
*Assistant Examiner* — Tabitha Chedekel

(57) ABSTRACT

A card formed in accordance with the invention includes a first assembly comprised of multiple plastic layers attached via an adhesive to a metal layer. The multiple plastic layers forming the first assembly are laminated under a first selected temperature and pressure conditions to preshrink the multiple plastic layers, stress relieve the first assembly and render the first assembly dimensionally stable. The laminated first assembly is then attached to a metal layer via an adhesive layer to form a second assembly which is then laminated at a temperature below the first selected temperature to form a card which is not subjected to warpage and delamination.

18 Claims, 5 Drawing Sheets

COMBINATION CARD OF METAL AND PLASTIC

BACKGROUND OF THE INVENTION

The invention relates to the manufacture of a card having a plastic layer forming one side of the card and a metal layer forming the other side of the card.

The term "card" or "cards" as used herein, and in the appended claims, is intended to include a large variety of documents and instruments such as transactional (financial) cards, identification (including National ID or Driver's License) cards, electronic passport pages, gift cards, documents for holding permanent and long lasting records such as medical records or security cards, or other cards used for promotion of a product or organization.

The manufacture of cards formed solely of a metal layer is known. These cards are intended to provide an indication of status and/or bestow a degree of prestige to the user. However, they are generally much more expensive to manufacture than the ubiquitous "plastic" cards.

Due to the prestige associated with the metal cards, it has become desirable to many users to have a "metal" card. However, the cost of manufacturing metal cards makes it uneconomical and hence undesirable in many applications. As a compromise, Applicant is proposing the use of a card which includes a metal layer and a plastic layer. Such a card would be much cheaper to make than a pure metal card. Such a card would also have some advantages such as the ease with which information may be formed on the plastic layer including the magnetic stripe, hologram and signature panel.

However, major problems exist in the manufacture of a card having a metal layer and a plastic layer. The normally different responses of the plastic and metal layers to temperature and stress tend to cause the card to warp and/or delaminate.

It is an object of the invention to manufacture a card formed with a metal layer attached to a plastic layer which is not subject to warpage and delamination.

SUMMARY OF THE INVENTION

In accordance with the invention, a card embodying the invention includes a first assembly comprised of multiple plastic layers which have been laminated at a first temperature and pressure. The first assembly is attached to a layer of metal material (e.g., stainless steel) via an adhesive to form a second assembly which is laminated at a second temperature and pressure. The first "plastic" assembly functions as one side of the card and the metal layer functions as the other side of the card.

A method for making a card embodying the invention includes the steps of: (a) laminating multiple plastic layers together to form a first "plastic" assembly. The multiple plastic layers are processed (e.g., laminated) to build up the thickness of the first assembly to a predetermined (e.g., half the card's) thickness and to stress relieve the plastic; the process of platen lamination inherently stress relieves (shrinks) the PVC layers assembly, rendering it dimensionally stable. The first assembly is processed (e.g., pre-shrunk) under selected pressure and temperature conditions to reduce subsequent dimensional changes.

(b) forming a second assembly which includes the first "plastic" assembly and a metal layer with an adhesive layer between the plastic assembly and the metal layer; and (c) subjecting the second assembly to a lamination process under predetermined temperature and pressure condition such that there is substantially no warping and no delamination of the layers forming the card.

Thus, cards embodying the invention may be formed such that one side of the card is metal and the other side of the card is plastic. In some embodiments, the thickness of the plastic layers are approximately equal to one-half the thickness of the card and the thickness of the metal layer is approximately equal to one-half the thickness of the card. In other embodiments the ratio of metal thickness to plastic thickness may be any desirable number.

Typically, after final lamination, the metal side of the card can be decorated by mechanical engraving, and/or lasering and/or embossing the outer surface of the metal layer. Similarly, the outer surface of the plastic layer can be modified by printing information thereon, and/or the addition of a magnetic stripe, and/or the addition of a signature panel and hologram. Note that each of these features each may be applied before or after lamination. For example, the outer surface of metal sheets used to form cards embodying the invention may be decorated prior to lamination with the plastic assembly. Similarly the outer surface of plastic sheets used to form cards embodying the invention can be processed and pre-decorated, prior to the lamination.

A card (or document) embodying the invention can be a standard transaction card, sized as per ISO 7810, or it can be of any other size, i.e., it can be larger, smaller, thinner or thicker.

An embodiment of the invention includes a method of; (a) making a first "plastic" assembly consisting of multiple plastic layers laminated at a relatively high temperature (e.g., 300 degrees Fahrenheit) and pressure; (b) forming a second assembly including a metal layer attached via an adhesive to the first plastic assembly; and (c) laminating the second assembly at a lower temperature (e.g., 280° F.) than the temperature used to laminate the first assembly. Laminating the second assembly at a lower temperature than the first assembly ensures that the plastic layers will not delaminate (come apart) and change dimension whereby the metal layer and the plastic layers do not display warpage.

A hologram and/or signature panel may be attached to the outer surface of the plastic side by hot stamping (or any other suitable process) after the final (second) lamination of the card assembly.

A contact chip can also be placed on the outer surface or within the plastic side by forming a cavity on and within the outer surface of the plastic side of the card (by milling or any other suitable process) and inserting a contact chip and adhesive within the cavity. The contact chip will be flush with the plastic surface and be visible.

Also, an RFID chip can be positioned between selected plastic layers of the first assembly and the plastic layers are then subjected to the first lamination. For this construction the RFID chip will be below the outer surface of the plastic layers.

BRIEF DESCRIPTION OF THE DRAWINGS

In the accompanying drawings, which are not drawn to scale, like reference characters denote like components, and.

DETAILED DESCRIPTION OF THE INVENTION

Figure 1A:
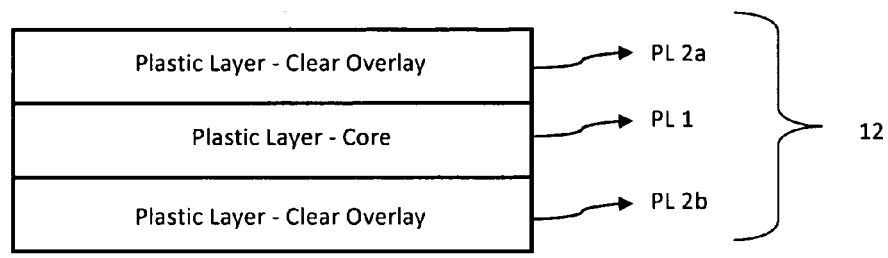
FIG. 1A is highly simplified cross-sectional diagram of a first "plastic" assembly used to practice the invention.

Referring to (highly simplified) FIG. 1A there is shown a core plastic layer PL1 with a clear overlay plastic layer PL2a, above layer PL1, and a clear overlay plastic layer PL2b, below layer PL1. This structure accommodates the application of print matter (e.g., information or decoration) on the top surface of the core layer (as illustrated by printed offset layer 121b shown in FIG. 1B) and/or on the bottom surface of the clear overlay PL2a facing the top surface of the core layer. This structure enables the printed information to be protected by the clear overlay(s) and to be visible through the clear overlay plastic layers.

After being collated these three layers (PL2a, Pl1 and PL2b) of plastic material are laminated together to form a first assembly 12. The use of three layers is by way of example only. The first assembly 12 can be formed of only two plastic layers or of more than three plastic layers. The plastic layers may be of polyvinyl chloride (PVC), Polyethylene terephthalate (PETG), Poly carbonate (PC) or any like plastic material which can be bound together by any appropriate adhesive layer.

In one embodiment, the (two or more) plastic layers, forming the first assembly 12, are laminated together using known laminating equipment under a platen temperature which is typically in the range of 300 to 350 degrees Fahrenheit at an absolute pressure ranging between 200 to 400 pounds per square inch absolute. The significance of first laminating the plastic layers together is to stress relieve the plastic; rendering it dimensionally stable. The first assembly, comprised of the various plastic layers, is processed (e.g., pre-shrunk) under selected pressure and temperature conditions to reduce subsequent dimensional changes. Note that the range of temperature and pressure noted above is by way of example only, and may be significantly expanded to make the desired product.

Figure 1B:
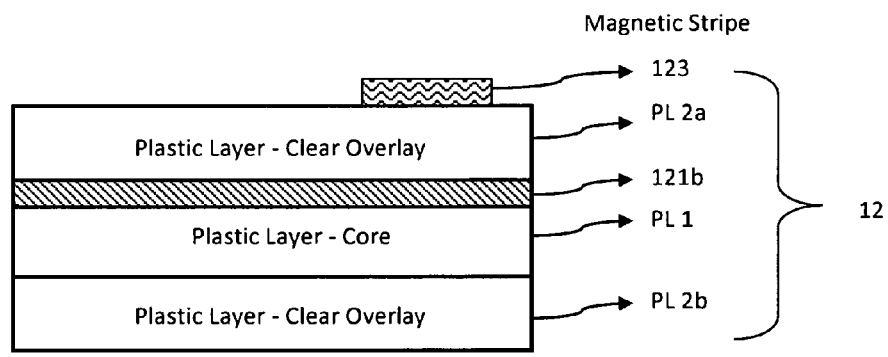
FIG. 1B is a simplified cross-sectional diagram of a first "plastic" assembly embodying the invention showing the addition of printing and a magnetic stripe.

Referring to FIG. 1B which is also a simplified cross-sectional diagram of a first "plastic" assembly 12 embodying the invention, there is shown offset print layer 121b containing information or decorative matter as discussed above. In addition, there is also shown a magnetic stripe 123 which is attached to the outer surface of layer PL2a. Note that the magnetic stripe 123 may be attached to the outer surface of layer PL2a (in any suitable manner) prior to the lamination step. Thus, the magnetic stripe may be laminated together with the plastic layers to form the first plastic assembly 12.

Figure 1C:
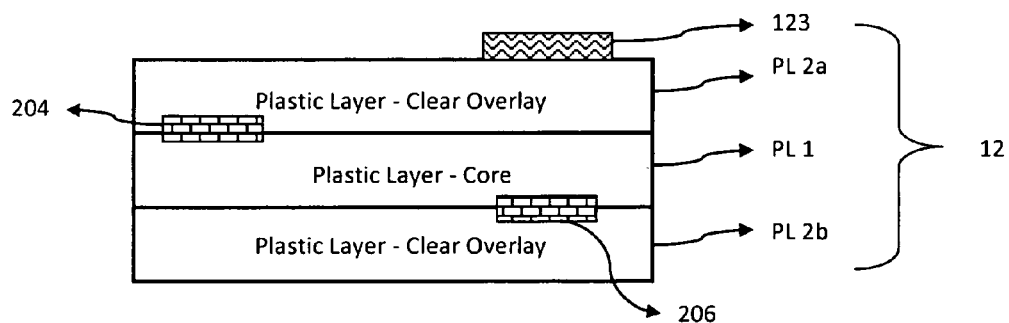
FIG. 1C is a simplified cross-sectional diagram of a first "plastic" assembly embodying the invention showing the addition of RFID chips between the plastic layers prior to lamination of the first assembly.
Figure 1D:
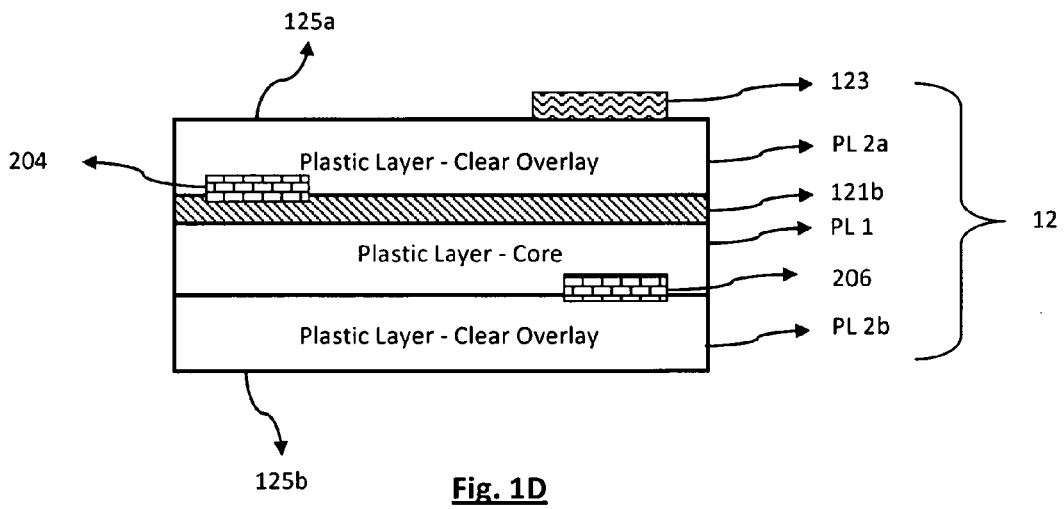
FIG. 1D is a simplified cross-sectional diagram of a first "plastic" assembly embodying the invention with the features shown in FIGS. 1B and 1C.
Figure 1E:
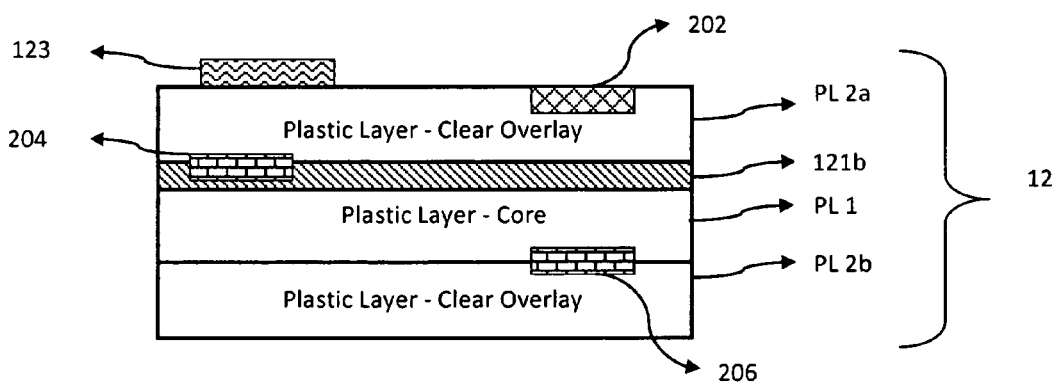
FIG. 1E is a simplified cross-sectional diagram of a first "plastic" assembly embodying the invention showing the addition of RFID chips and a contact chip.

Referring to FIGS. 1C, 1D and 1E, which are also simplified cross-sectional diagrams of a first "plastic" assembly 12 embodying the invention, there is shown the insertion of an RFID chip 204 between plastic layers PL2a and PL1 and an RFID chip 206 between plastic layers PL1 and PL2b. The RFID chips would typically be inserted between the plastic layers prior to the lamination of the plastic layers forming the first assembly and would thus be under (below) the outer surfaces of the top plastic layer.

FIG. 1D is a simplified cross-sectional diagram of a first "plastic" assembly embodying the invention illustrating that a first assembly 12 can include the plastic layers, an offset print layer 121b, RFID chips and a magnetic stripe and that this assembly is subjected to a lamination step, as described above.

FIG. 1E is a simplified cross-sectional diagram of a first "plastic" assembly embodying the invention showing the addition of a contact chip 202 to the first assembly 12, after the first assembly has undergone lamination.

Referring to FIGS. 2A, 2B, 2C and 2D, there is shown a second assembly 13 comprised of the first assembly 12, an adhesive layer 14, and a metal layer 16. The adhesive layer 14 may be, for example, waytech w39, or thermoplastic polyurethane, or any suitable adhesive. The metal layer 16 may be, for example, stainless steel, brass, copper, aluminum, or any appropriate metal material. The metal layer may be a clad metal layer which can constitute more than one metal layer.

The second assembly 13 is laminated under a platen temperature which is typically 20° F. to 30° F. degrees below the temperature to which the first assembly was subjected at an absolute pressure ranging between 200 to 400 pounds per square inch absolute. Maintaining the temperature of the laminating step of the second "metal-plastic" assembly 13 below that of the first "plastic" assembly 12 ensures that the plastic assembly does not get delaminated and/or, subjected to dimensional changes. It is a characteristic of plastics that they retain physical memory of the highest temperature at which they have been tempered. Thus, the plastic layers of the first assembly retain their dimensional stability until the first assembly is subjected to a temperature which exceeds the prior highest temperature applied to it. By laminating the second assembly 13, comprised of the first assembly 12 and the metal layer 16, at a lower temperature than the laminating temperature of the first assembly, the dimensional stability of the assembly is maintained and there is substantially no warpage of the plastic and metal layers.

Figure 2A:
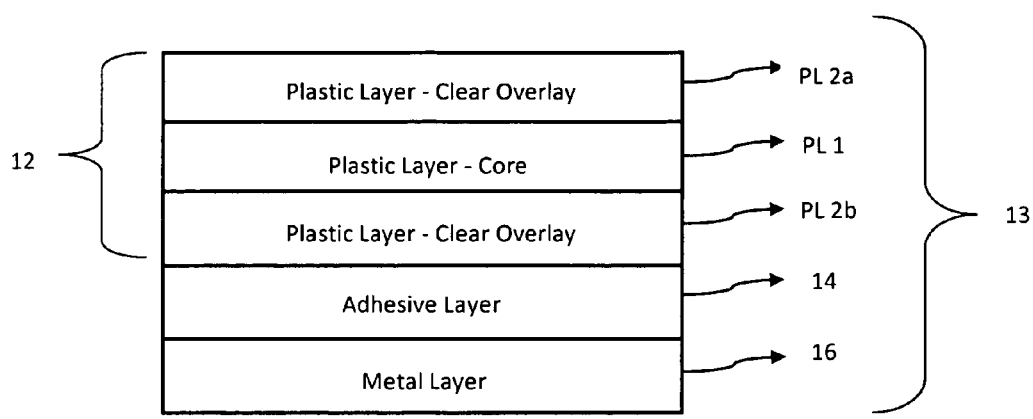
FIG. 2A is a highly simplified cross-sectional diagram of a second assembly embodying the invention combining a first plastic assembly of the type shown in FIG. 1A with a metal layer.

FIG. 2A is a highly simplified illustration of a first "plastic" assembly 12 which has been laminated (first lamination) and which is attached to a metal layer 16 via an adhesive layer and where the combination is subjected to (a second) lamination to form a second assembly 13.

Figure 2B:
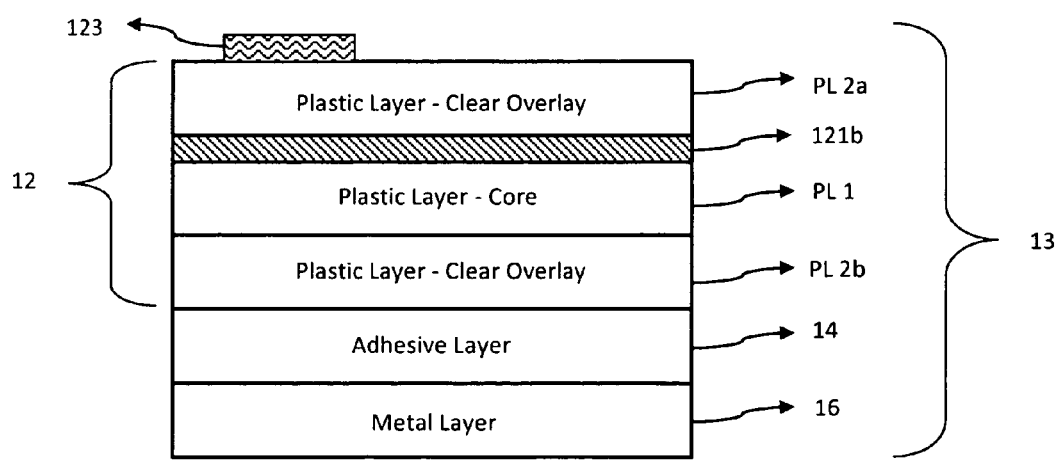
FIG. 2B is a simplified cross-sectional diagram of a second assembly embodying the invention combining a first plastic assembly of the type shown in FIG. 1B with a metal layer.

FIG. 2B is similar to FIG. 2A but shows the first assembly 12 to include a magnetic stripe 123 and a print layer 121b.

Figure 2C:
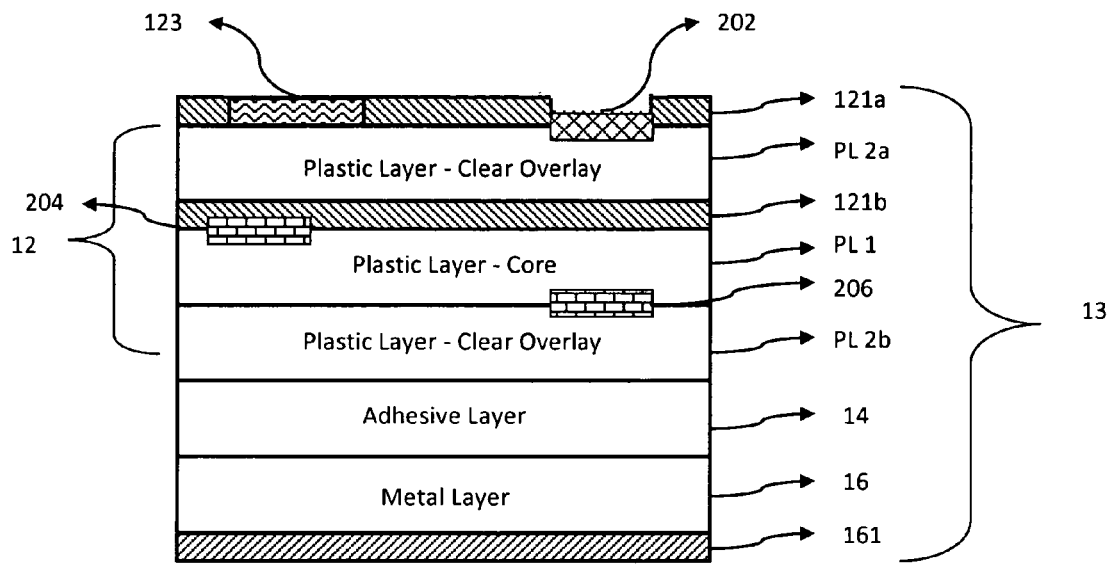
FIG. 2C is a simplified cross-sectional diagram of a second assembly embodying the invention combining a first plastic assembly with a metal layer and with printed information added to the metal and plastic layers.
Figure 2D:
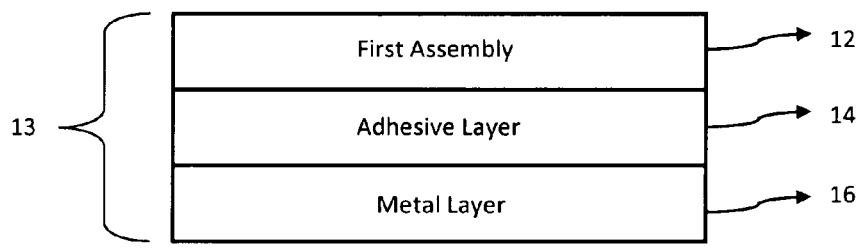
FIG. 2D is a highly simplified cross-sectional diagram of a second assembly embodying the invention in which a first plastic assembly is attached to a metal layer.

FIG. 2C, is intended to show that after lamination of the second assembly 13 an outer surface or region 161 of metal layer 16 may be etched, embossed or engraved (coined and debossed) with any personalized information or decorated with any pattern. In addition FIG. 2C is intended to show that an offset printed layer 121a may be attached or formed on the outer surface of plastic layer PL2a. As noted above, a magnetic stripe 123 may also be attached to the outer surface of layer PL2a.

Referring to FIGS. 2C and 1E there is shown a contact chip 202 placed within the top region of plastic layer PL2a by forming a cavity on, and within, the outer surface of plastic layer PL2a of the card. A cavity may be formed by milling or any other suitable process and inserting a contact chip within the cavity. The contact chip will generally be flush with the plastic surface and can be visible, although it could also be placed along the outer surface of layer PL2a. The contact chip 202 is typically added after the card is finished, but it can be inserted or placed before or after the lamination processes of the first and second assemblies. A second assembly 13 of a "metal-plastic" card embodying the invention with contact and RFID chips could be as shown in FIG. 2C.

For a card whose thickness is approximately 0.03 inches, the cumulative thickness of the layers forming the first "plastic" assembly layer can range from 0.005 to 0.025 inches. The adhesive layer may range from 0.0005 to 0.005 inches and the metal layer thickness may range from 0.008 to 0.025 inches.

A card embodying the invention may be made such that it is essentially half metal and half plastic. However, it should be evident that the thickness ratio of metal to plastic may be greatly varied. Also, the thickness of the card may be greater or less than 0.03 inches.

Figure 3:
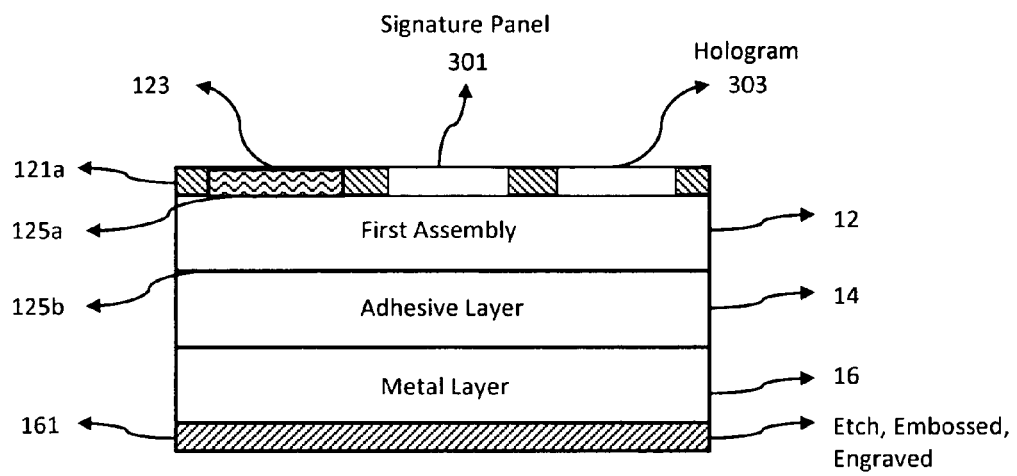
FIG. 3 is a simplified cross-sectional diagram of a second assembly embodying the invention showing features which may be added to the second assembly after lamination.

Referring to FIG. 3, it is shown that, after the first assembly 12 and the metal layer 16 have been laminated to form the second assembly 13, printed matter 121a may be formed (or attached) on the outer surface of the first assembly 12. In addition, a signature panel 301 and/or a hologram 303, as well as magnetic stripe 123 (which may have been previously attached) may be attached or formed on the outer (upper) surface of the first assembly.

Figure 4:
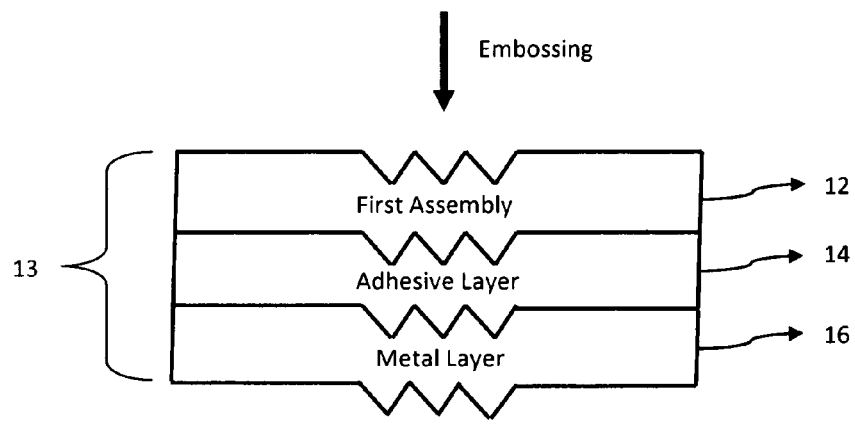
FIG. 4 is a simplified cross-sectional diagram of a second assembly embodying the invention showing an embossing step applied to the second assembly.

Referring to FIG. 4, it is shown that after the metal-plastic card resulting from the second assembly 13 has been laminated it may be embossed to personalize the card and/or impart any desired information or decoration to the card. Typically, the embossing of the card will come from the plastic side and extend through to the metal side. The embossing will then cause a pattern to be raised on the metal side.

Some desirable features of a metal-plastic card include the following:
(1) There is a much higher perceived value than an all plastic card; (2) It is fully functional; (3) It is more economical to make than an all metal card; (4) Full metal front gives appearance of all metal card; and (5) The card can be embossed.

In accordance with one aspect of the invention two or more sheets of plastic material are collated and then laminated at a first temperature and pressure to form a first assembly of predetermined thickness. The first assembly may then be tested to ensure the functionality of the first assembly prior to final assembly. The first assembly is then attached via an appropriate adhesive to a sheet of metal material to form a second assembly. The second assembly is then laminated at a second temperature which is lower than the first temperature to form a laminated "metal-plastic" sheet which can then be cut to form individual cards. The individual cards may be subsequently personalized.

Note that the metal sheet may be decorated before or after lamination. Likewise, the plastic layers may be decorated before or after lamination.

Steps in forming a metal-plastic card embodying the invention may include the following
1—The application of print material 121b on the top surface (in the figures) of the core layer PL1 or on the bottom surface of the plastic layer PL2a. [The offset print layer (e.g., 121a, 121B) may be approximately 0.010 inches thick.]
2—Attaching a layer of magnetic material to form a magnetic stripe (e.g., 123) to the outer surface of the top most layer of a clear plastic layer (e.g., PL2a) and laminating the magnetic stripe and the plastic layer PL2a. [the thickness of the magnetic stripe may be in the range of 0.0005" (12.5 microns) and the thickness of the PL2a layer may be in the range of 0.001" to 0.005" (25 to 125 microns).]
3—Collating the combination of a first clear plastic layer PL2a (with the magnetic stripe attached) with a second core plastic layer PL1 and a third plastic layer PL2b and locating selected RFID chips between the first and second plastic layers and/or between the second and third plastic layers.
4—Platen Laminate the combination of the first clear plastic layer PL2a (with the magnetic stripe attached), the second core plastic layer PL1 and the third plastic layer PL2b with the installed RFID chips at a predetermined temperature and pressure to form the first assembly 12, whose outer (upper) surface (which corresponds to the outer surface of PL2a) is identified as 125a and whose inner(bottom most) surface (which corresponds to the outer surface of PL2b) is identified as 125b.
5—Apply an adhesive to surface 125b (the bottom most surface of PL2b as shown in the figures) of the first assembly 12.
6—Form a combination (sandwich) by attaching a metal layer via the adhesive to the first assembly.
7—Platen laminate the combination of the first assembly with the metal layers at a temperature which is less (preferably by at least 20 degrees Fahrenheit) than the predetermined temperature.

What is claimed is:
1. A method of making a card comprising the steps of:
forming a first assembly of a first predetermined thickness, said first assembly including at least two layers of plastic material;
firstly laminating the at least two layers of different plastic material at a first predetermined temperature and pressure for forming said first assembly; wherein said first lamination step comprises preshrinking the at least two layers of plastic material and reducing subsequent dimensional changes of the layers forming the first assembly;
secondly forming a second assembly including said first assembly and a metal layer with an adhesive layer between the first assembly and the metal layer; and
laminating the second assembly at a temperature which is lower than the first predetermined temperature.
2. A method as claimed in claim 1, wherein the at least two layers of plastic material includes different plastic materials, wherein the first predetermined temperature is a temperature in excess of 300 degrees Fahrenheit; and wherein the laminating temperature of the second assembly is at a temperature of less than 300 degrees Fahrenheit.
3. A method as claimed in claim 1, wherein the at least two layers of plastic material includes different plastic materials, and wherein the plastic layers may be selected from a polyvinyl chloride (PVC) material, a polyethylene terephthalate (PETG) material, a poly carbonate (PC) material or any like plastic material.

4. A method as claimed in claim 1, wherein the metal layer may be formed from one of stainless steel, brass, copper, aluminum, or any appropriate metal material or any clad metal layer.

5. A method as claimed in claim 1 wherein the thickness of the first assembly makes up substantially half of the card's thickness and the metal layer makes up substantially the other half of the card's thickness.

6. A method as claimed in claim 1, wherein the outer surface of the first assembly includes at least one of a printed pattern, a magnetic stripe, a hologram, a contact chip and a signature panel.

7. A method as claimed in claim 1, wherein the outer surface of the metal layer includes a pattern formed by at least one of etching, engraving, lasering, embossing or coining the outer surface of the metal layer.

8. A method as claimed in claim 1, further including the placement of an RFID chip between selected layers of the plastic layers forming said first assembly prior to the lamination of the first assembly.

9. A method as claimed in claim 1, wherein the first assembly includes a core layer with a first clear overlay plastic layer above the core layer and a second clear overlay plastic layer below the core layer.

10. A method as claimed 1, further including the step of embossing the second assembly after it has been laminated for the purpose of personalizing the card.

11. A card comprising:
a first assembly comprised of multiple plastic layers which wherein the multiple plastic layers have been laminated at a first temperature and pressure to preshrink the layers and reduce their subsequent dimensional changes; said first assembly having an inner surface and an outer surface;
the outer surface defining one of the top and bottom side of the card;
a layer of metal material and an adhesive layer;
the layer of metal material having an inner surface and an outer surface; the inner surface of the layer of metal material being attached to the inner surface of the first assembly via said adhesive layer, the combination of said first assembly, adhesive layer and the metal layer forming a second assembly which is laminated at a temperature which is less than the first temperature, and wherein the outer surface of the layer of metal material defines the other one of the top and bottom side of the card.

12. The card as claim in claim 11, wherein said first assembly comprised of multiple plastic layers includes at least two different plastic materials, wherein the card has a given thickness; and wherein the first assembly has a thickness, which constitutes substantially one half of the card's thickness and wherein the thickness of the layer of metal constitutes substantially the other half of the card's thickness.

13. The card as claim in claim 11, wherein the first assembly includes a core layer with a first clear overlay plastic layer above the core layer and a second clear overlay plastic layer below the core layer.

14. The card as claim in claim 11, wherein the plastic layers may be selected from a polyvinyl chloride (PVC) material, a polyethylene terephthalate (PETG) material, a poly carbonate (PC) material or any like plastic material and wherein the metal layer may be formed from one of stainless steel, brass, copper, aluminum, or any appropriate metal material or any clad metal layer.

15. The card as claim in claim 11, wherein the outer surface of the first assembly includes at least one of a printed pattern, a magnetic stripe, a hologram, a contact chip and a signature panel.

16. The card as claimed in claim 11 wherein the outer surface of the metal layer includes a pattern formed by at least one of etching, engraving, lasering, embossing or coining the outer surface of the metal layer.

17. The card as claimed in claim 11 further including the placement of an RFID chip between selected layers of the plastic layers forming said first assembly prior to the lamination of the first assembly.

18. A card as claimed in claim 11, wherein the second assembly forms a metal-plastic card and wherein the card is embossed from the plastic side to form a pattern which extends from the plastic side and through to the metal side, whereby the embossed pattern causes a raised pattern on the metal side.

* * * * *